US009204264B2

(12) United States Patent
Haruna et al.

(10) Patent No.: US 9,204,264 B2
(45) Date of Patent: Dec. 1, 2015

(54) EXCHANGE OF MESSAGES AND SESSIONS (75) Inventors: Adamu Haruna, Tampere (FI); Hans Rohnert, Munich (DE); Ivo Sedlacek, Kurim (CZ)

(73) Assignee: NOKIA CORPORATION, Espoo (FI)

( * ) Notice: Subject to any disclaimer, the term of this patent is extended or adjusted under 35 U.S.C. 154(b) by 1399 days.

(21) Appl. No.: 12/418,383

(22) Filed: Apr. 3, 2009

(65) Prior Publication Data
US 2010/0011069 A1 Jan. 14, 2010

(30) Foreign Application Priority Data

Apr. 4, 2008 (EP) .................................. 08154075

(51) Int. Cl.
| H04W 4/10 | (2009.01) |
| H04L 12/58 | (2006.01) |
| H04L 29/06 | (2006.01) |
| G06F 15/16 | (2006.01) |
| H04W 76/00 | (2009.01) |
| H04W 4/20 | (2009.01) |

(52) U.S. Cl.
CPC ................ *H04W 4/10* (2013.01); *H04L 51/16* (2013.01); *H04L 51/36* (2013.01); *H04L 65/1083* (2013.01); *H04W 76/005* (2013.01); *H04W 4/20* (2013.01)

(58) Field of Classification Search
CPC ............................ H04L 51/16; H04L 65/1083
USPC ........................................................ 709/206
See application file for complete search history.

(56) References Cited

U.S. PATENT DOCUMENTS 5,832,502 A    11/1998  Durham et al.
2007/0033250 A1*  2/2007  Levin et al. .................. 709/204

FOREIGN PATENT DOCUMENTS

WO       2007-107628 A1    9/2007
WO    WO 2007/107628       9/2007

OTHER PUBLICATIONS

"Converged IP Messaging Requirements", Open Mobile Alliance, OMA-RD-CPM-V1_0-20071106-C, "http://member.openmobilealliance.org/ftp/Public_documents/REQ/REQ-CPM/PERMANENT_DOCUMENTS", Nov. 6, 2007, pp. 1-71.*
International Search Report and Written Opinion, received in correspnding PCT Application No. PCT/IB2009/005182, issued by European Patent Office (ISA), Oct. 15, 2009, 13 pages.
Open Mobile Alliance, "Converged IP Message Requirements", Nov. 6, 2007, 71 pages.

(Continued)

Primary Examiner — Suraj Joshi
(74) Attorney, Agent, or Firm — Ditthavong & Steiner, P.C.

(57) ABSTRACT

A Conversation-ID indication, a Contribution-ID indication and an optional In-reply-to-Contribution-ID indication are contained in individual standalone CPM Messages and the CPM Session Invitation messages only. The Conversation-ID indication allows assigning the CPM messages and media to the CPM conversations. The Contribution-ID identifies the individual standalone CPM message or the CPM session Invitation. Usage of the Contribution-ID indication and the In-reply-to-Contribution-ID indication allow associating the CPM session messages and the standalone CPM messages belonging to the same CPM conversation (i.e. having the same Conversation ID) into a tree view representing the CPM Conversation. The media and CPM Messages within a CPM session is implicitly linked to the CPM session invitation and further organized based on the time to form a list.

14 Claims, 4 Drawing Sheets (56) References Cited

OTHER PUBLICATIONS

European Office Action for corresponding EP Application No. 08 154 075.9-2413, May 12, 2011, pp. 1-5.
Open Mobile Alliance, "Converged IP Message Requirements," Nov. 6, 2007, 71 pages.
Office Action for related Euroepan Patent Application No. 08 154 075.9 dated Jul. 5, 2012, pp. 1-4.
European Communication for European Patent Application No. 08 154 075.9 dated Nov. 21, 2011, pp. 1-5.
Korean Office Action for Korean Patent Application No. 2010-7024850 dated Sep. 29, 2011, pp. 1-6.

* cited by examiner

EXCHANGE OF MESSAGES AND SESSIONS

RELATED APPLICATION

This application claims priority to European Application No. 08154075.9 filed Apr. 4, 2008, which is incorporated herein by reference.

FIELD OF THE INVENTION

The present invention relates to messaging, and particularly to the exchange of messages and/or sessions in conversation.

BACKGROUND OF THE INVENTION

IP Multimedia Subsystem (IMS) is a 3rd Generation Partnership Project (3GPP) standardised network architecture that provides an access network independent standardised interface for creating services, charging mechanisms and better Quality of Service (QoS) than best effort. Examples of the services that are implemented on IMS at the moment are PSTN functionality, Push-to-talk over cellular (PoC), Presence, Instant messaging and video sharing.

A Converged IP Messaging (CPM) workgroup inside the Open Mobile Alliance, OMA, aims to remove the silos between traditional messaging services caused by technical differences, and provide users with a smooth, unified service experience. The OMA CPM is a messaging framework which accommodates different user experiences such as deferred and immediate messaging, session-based messaging, and half-duplex or full-duplex conferencing. The objective of OMA CPM is to consolidate common functionalities of existing messaging services and new features introduced by the convergence of communications brought by session initiation protocol (SIP) based technologies. The OMA CPM also interacts with other OMA enablers. Interworking with legacy messaging services like SMS and MMS permits CPM to be interesting from the start, as it does not rely only on the initially limited IMS community to deliver its services The page mode messaging, which is based on the SIP method MESSAGE can be seen as the equivalent to SMS in the SIP/IMS world. A user can send a page mode short message to another user or a group of users. This message is either delivered instantly over the IMS core network or stored for deferred delivery if the recipient is not available. The session-based messaging is based on a SIP session, with messages delivered through a protocol called MSRP. Session-based messaging essentially serves two requirements that cannot be fulfilled by page mode messaging: the support of chats, in which messages are exchanged between two or more parties within a dialog context; the possibility to send large volume files like music or video clips. In addition, session-based messaging has two important benefits: it minimizes SIP control traffic to session management, and utilizes a specific protocol for the messages itself, permitting to implement an appropriate support in the network; by reusing the concept of SIP session, it permits messaging to be one component among others in a multimedia session. The scope of multimedia communication supported by CPM is very broad, including discrete and continuous media, such as text, images, binary files, audio, video.

These aims are defined in the document "Converged IP Messaging Requirements, Candidate Version 1.0", 6 Nov. 2007 (OMA-RD-CPM-V1_0-20071106-C).

The document "OMA Converged IP Messaging System Description, Draft Version 1.0", 25 Mar. 2008 (OMA-TS-CPM_System_Description-V_0-20080325-D) defines a feature called "CPM Conversation", which is association of standalone CPM messages and CPM sessions with the CPM messages and media exchanged within it.

"CPM Conversation" is the exchange of CPM Messages and/or CPM Sessions, associated with each other due to common characteristics, between two or more participants (e.g. CPM users or applications). A CPM Conversation where one participant communicates with another participant may be called a 1-1 CPM Conversation. A CPM Conversation with many participants and in which all participants communicate with one another may be called a 1-N CPM Conversation.

A CPM Conversation is constituted by any number of CPM Messages and CPM Sessions. The CPM Conversation represents the "live" information exchange that participants can have exploiting the CPM enabler functionalities, where this information can be associated together by common characteristics. Examples of principals include an individual user, a group of individuals, a corporation, service enablers/applications, system entities and other legal entities.

A CPM message is information of a discrete nature that can contain several discrete media (e.g. text, images, audio-clips, video-clips). A CPM message can be sent within or outside a CPM session, where a CPM session represents a logical connection between two or more participants established for a finite duration. In a CPM Session, the participants can also exchange continuous media that due to the continuous nature of this type of information requires a logical connection (i.e. with a beginning and an end) to be set up and maintained between CPM participants. A user may be able to participate in several CPM conversations in parallel.

A CPM user may be able to set preferences for the message handling mechanism used by the CPM network in case the CPM user is not available for receiving the CPM message (e.g. not registered in the home network, user does not wish to receive it immediately). Such preferences may include, for example, to discard the CPM message while providing a notification to the sender based on service provider policies and sender's preferences, to defer the CPM message, or to store the CPM message in a network-based storage. The network-based storage may a Message and Media Storage component that archives everything that needs to be archived. For example, the CPM network may support one or more of the following storage functionalities: storage of user's contact list; storage of media; storage of conversations and CPM Messages and media related to conversations; storage of history for single messages and conversations (stored with contact, time, messages, shared media to allow filtering of histories to user's views); synchronization of contacts, media, conversations, etc. This storage capability may be controlled by user preferences and service provider policies.

Figure 1:
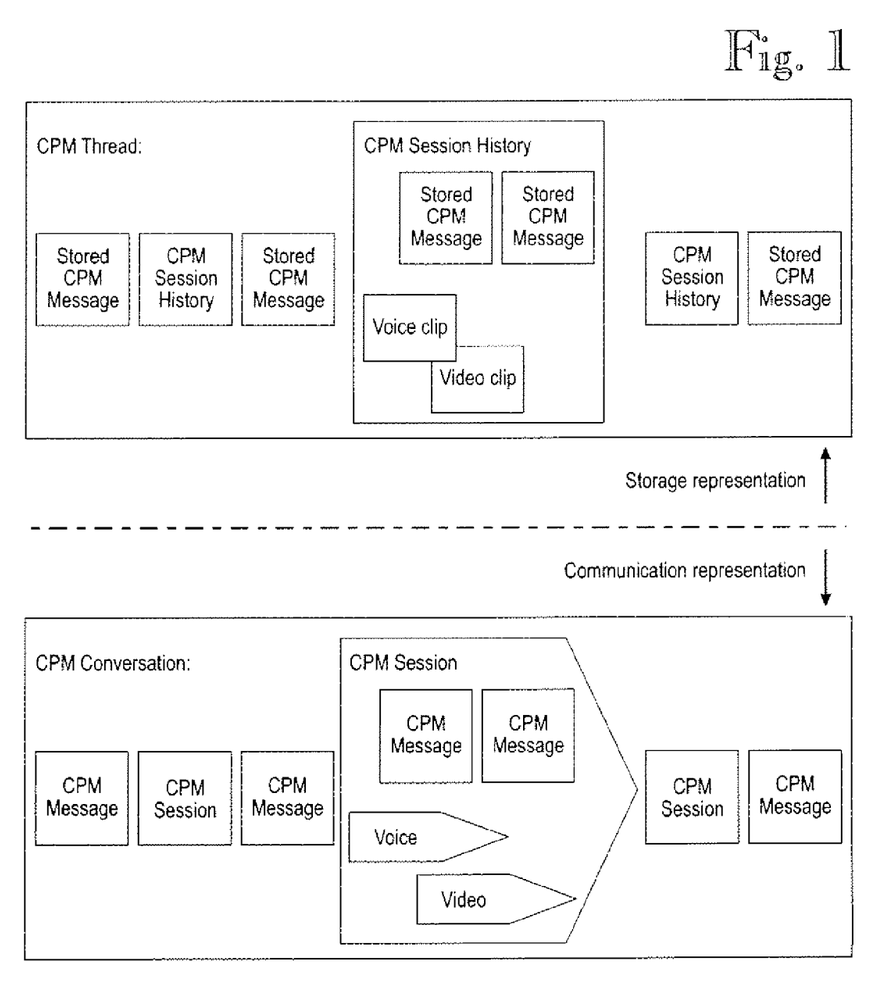
FIG. 1 illustrates the concepts of a CPM conversation and a CPM thread and the relationship between them.

FIG. 1 illustrates the concepts of a CPM conversation and a CPM thread and the relationship between them. Authorized users can capture and store the information that they have been exchanging during a CPM a conversation as a CPM thread in a network-based storage provided by a CPM service provider. As such, a CPM message may become stored and continuous media may become stored (e.g. voice-clip, video-clip). When the stored CPM messages and the stored media are part of the same CPM session, they are associated together in the network-based storage as a CPM Session History. Stated in another manner, a CPM thread can be described as CPM session histories and stored CPM Messages, derived respectively from the CPM sessions and any CPM messages exchanged outside a CPM session during a CPM conversation.

It is also desired the CPM-enabled devices be able to present the stored CPM messages and CPM session histories belonging to a CPM thread in a threaded view according to the user's preferences. To that end there should be means to recognize CPM messages and CPM sessions as part of a CPM conversation.

BRIEF DESCRIPTION OF THE INVENTION

An object of the present invention is to provide a mechanism to identify and to store a conversation thread. The object of the invention is achieved by means of methods, apparatuses, a network element, a computer program, and a computer readable storage medium as claimed in the independent claims. The preferred embodiments of the invention are disclosed in the dependent claims.

According to an aspect of the invention, a method comprising—exchanging stand-alone messages and/or sessions in a conversation between two or more participants via a controlling network server,—providing standalone messages and/or session invitation messages with one or more of following identities: a conversation identity linking the standalone messages and/or session invitation messages to the conversation; providing standalone messages and/or session invitation messages with a a contribution identity to denote a particular standalone message or session invitation message; and a replied contribution identity which equals to a contribution identity of a replied standalone message or session invitation message, when the stand-alone message or session invitation message is a reply to one of the preceding standalone messages and/or session invitation messages within the conversation; and—storing the standalone messages and/or sessions belonging to the conversation into a thread based on the conversation identity, the contribution identities and/or the replied contribution identities.

According to another aspect of the invention, a method comprises—exchanging standalone messages and/or sessions in a conversation between two or more participants via a controlling network server,—providing standalone messages and/or session invitation messages with a conversation identity linking the standalone messages and/or session invitation messages to the conversation,—storing the standalone messages and/or sessions belonging to the conversation into a thread based on the conversation identity.

According to still another aspect of the invention, a method comprises—exchanging standalone messages and/or messaging sessions in a conversation between two or more participants via a controlling network server,—providing standalone messages and/or session invitation messages with a conversation identity linking the standalone messages and/or session invitation messages to the conversation,—providing each standalone message or session invitation message with a dedicated contribution identity that identifies the respective standalone message and/or session invitation message within the conversion,—providing such standalone message or session invitation message which is a reply to one of the preceding standalone messages and/or session invitation messages within the conversation with a replied contribution identity which equals to the contribution identity of the replied standalone message or session invitation message,—storing the standalone messages and/or sessions belonging to the conversation into a thread based on the conversation identity, the contribution identities and the replied contribution identities.

According to still another aspect of the invention, a method comprises—exchanging standalone messages and/or sessions in a conversation between two or more participants via a controlling network server,—providing each standalone message or session invitation message with a dedicated contribution identity that identifies the respective standalone message and/or session invitation message within the conversion,—providing such standalone message or session invitation message which is a reply to one of the preceding standalone messages and/or session invitation messages within the conversation with a replied contribution identity which equals to the contribution identity of the replied standalone message or session invitation message,—storing the standalone messages and/or sessions belonging to the conversation into a thread based on the contribution identities and the in-reply-to-contribution identities.

According to an embodiment of the invention, the controlling network server indicates an active conversation identity, an active contribution identity and/or an active replied contribution identity, if any, in a terminating session invitation message sent from the network server.

According to an embodiment of the invention, the controlling network server is configured to receive a standalone message or a service invitation message indicating at least one of a conversation identity, a contribution identity and a replied contribution identity, and to preserve the received conversation identity, contribution identity and/or replied contribution identity indicated in said received standalone message, when forwarding said received standalone message.

According to an embodiment of the invention, the controlling network server is configured to set an active conversation identity according to a pre-defined conversation identity of a pre-defined communication group, if a received session invitation message is for a pre-defined group with a pre-defined conversation identity; or according to a conversation identity of the session invitation message which initiated a targeted session, if a received session invitation message is targeted to a session that already exists; or according to a conversation identity indicated in a presently received session invitation message.

According to an embodiment of the invention, the controlling network server is configured to set an active contribution identity according to a contribution identity of the session invitation message which initiated a messaging session, if the targeted session already exists; or according to a contribution identity indicated in a presently received session invitation message.

According to an embodiment of the invention, the controlling network server is configured to set an active in-reply-to-contribution identity according to a contribution identity of the session invitation which initiated a targeted session, if the targeted session already exists; or according to a contribution identity indicated in a presently received session invitation message.

According to an embodiment of the invention, the controlling network server is configured, in response to receiving a session invitation message indicating a conversation identity that is different from an active conversation identity, to send a session invitation response indicating the active conversation identity, the active contribution identity and the active replied contribution identity to a sender of the session invitation message.

According to an embodiment of the invention, a client device that has sent a session invitation message is configured to, in response to receiving a session invitation response indicating the active conversation identity, the active contribution identity and the active replied contribution identity, configuring to use the active conversation identity, the active contribution identity and the active replied contribution identity, if they are different from the identities used in the session invitation.

According to an embodiment of the invention, a standalone message or a session invitation message is mapped to a session initiation protocol messages (e.g. MESSAGE and INVITE), and a conversation identity, a contribution identity and/or a replied contribution identity are mapped to parameters and/or headers of the session initiation message.

According to an aspect of the invention, an apparatus comprises—a communication unit configured to send standalone messages and/or sessions in a conversation,—a controller configured to provide standalone messages and/or session invitation messages with one or more of following identities: a conversation identity linking the standalone messages and/or session invitation messages to the conversation; a a contribution identity to denote a particular stand-alone message or session invitation message; and a replied contribution identity which equals to a contribution identity of a replied standalone message or session invitation message, when the standalone message or session invitation message is a reply to one of the preceding standalone messages and/or session invitation messages within the conversation; so as to enable storing the standalone messages and/or messaging sessions belonging to the conversation into a thread based on the conversation identity, the contribution identities and/or the replied contribution identities. According to an embodiment of the invention, an apparatus further comprises an associated storage configured to store the standalone messages and/or sessions belonging to the conversation into a thread based on the conversation identity, the contribution identities and/or the replied contribution identities.

According to an aspect of the invention, an apparatus comprises—a communication unit configured to exchange standalone messages and/or sessions relating to a conversation between two or more participants,—a controller configured to provide standalone messages and/or session invitation messages with one or more of following identities: a conversation identity linking the standalone messages and/or session invitation messages to the conversation; a a contribution identity to denote a particular standalone message or session invitation message; and a replied contribution identity which equals to a contribution identity of a replied standalone message or session invitation message, when the standalone message or session invitation message is a reply to one of the preceding standalone messages and/or session invitation messages within the conversation;—a data storage configured to store the standalone messages and/or sessions belonging to the conversation into a thread based on the conversation identity, the contribution identities and/or the replied contribution identities.

According to an aspect of the invention, a network element comprises means for performing any of method steps according to various embodiments of the invention.

According to an aspect of the invention, a computer program comprises program code means adapted to perform any of method steps according to various embodiments of the invention, when the program is run on a computing device.

According to an aspect of the invention, a computer readable storage medium has a program recorded thereon, the program making a computer to execute method steps according to various embodiments of the invention, when the program is run on a computing device.

BRIEF DESCRIPTION OF THE DRAWINGS

In the following the invention will be described in greater detail by means of preferred embodiments with reference to the attached drawings, in which.

EXEMPLARY EMBODIMENTS OF THE INVENTION

Example embodiments of the present invention will be described using a Converged IP Messaging (CPM) domain of the Open Mobile Alliance, OMA, as an example of a messaging domain and technology. The invention is, however, not intended to be restricted to any examples described herein.

Figure 2:
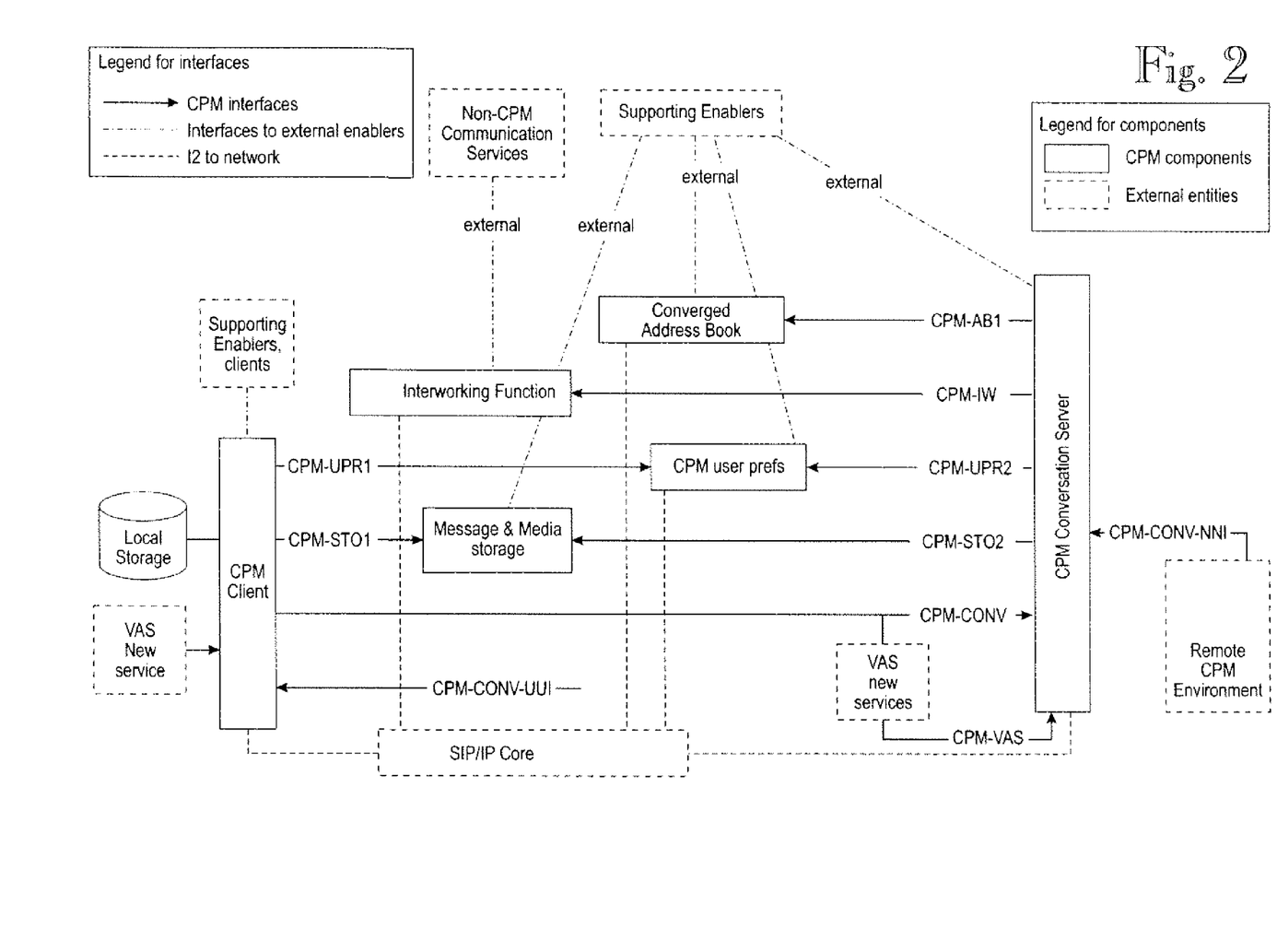
FIG. 2 shows a schematic block diagram illustrating an example of a CPM architecture.

A present scenario of a possible architecture and operation of a Converged IP Messaging (CPM) domain is disclosed in the document "Converged IP Messaging Requirements, Candidate Version 1.0", 6 Nov. 2007, OMA-RD-CPM-V1_0-20071106-C), which is incorporated by reference herein. In the CPM domain, There may be a plurality of CPM networks or service providers. An exemplary architecture of of one CPM network, according to the present scenario of OMA, shown schematically in FIG. 2, may comprise various components, entities, or functions, such as a CPM conversation server, CPM clients (user agents of the users), message and media storage, converged address book, CPM user preferences, an interworking function, etc. The CPM network may also support a generalized interface for Value Added Service (VAS) to communicate with. The CPM network may also cooperate with other CPM networks. CPM domain may also have an interworking with non-CPM Communication Service Domains so that users 10 of non-CPM communication services can communicate with CPM users 14 through the CPM service domain.

However, the architecture of the CPM domain is not essential to the present invention but may be implemented in any suitable way. Therefore, the CPM domain or enabler is not described or illustrated in more detail herein.

The CPM Enabler also supports a conversation handling, including control of the conversation and a network-based storage of a CPM thread, which may be described as CPM session histories and stored CPM messages, derived respectively from the CPM sessions and any CPM messages exchanged outside a CPM session during a CPM conversation. This storage capability may be controlled by user preferences and service provider policies. User preferences of a CPM user comprise user settings that define the way the user prefers to communicate and that control aspects of how a user perceives and receives services. In the following examples, the conversation handling functions and the network-based storage are described as being implemented in a conversation server unit in the CPM network, but the invention is not intended to be restricted to such implementation. The various CPM functions may be distributed in any number of servers, storage units or any other network elements or entities, depending on the implementation of the CPM network, without departing from the present invention.

The network-based storing of the CPM conversation, a CPM thread may be stored that includes the CPM standalone messages and the CPM session histories for CPM sessions associated with the CPM conversation. As such, a CPM message may become stored and continuous media may become stored (e.g. voice-clip, video-clip). When the stored CPM messages and the stored media are part of the same CPM session, they are associated together in the network-based storage as a CPM session history. Thus, storing/recording of CPM conversation also means recording of the real time media and CPM messages of the CPM session.

The media and/or CPM Messages within a CPM session are implicitly linked to the CPM session invitation and further organized based on the time; the CPM message thread of the media and/or the CPM messages inside the CPM sessions forms a list.

According to an exemplary embodiment of the invention, the CPM message and the CPM session will be extended with further end-to-end indications containing: a conversation identity (Conversation ID) that links the CPM session or the standalone CPM message to a CPM conversation; a contribution identity (Contribution ID) that identifies the CPM session or the standalone CPM message and is an anchor for In-reply-to-Contribution-ID values; and a replied contribution identity (In-reply-to-Contribution-ID) that contains the Contribution-ID value of the replied original CPM session or standalone CPM message. The Conversation-ID indication allows assigning the CPM messages and media to the CPM conversations. Usage of the Contribution-ID indication and the In-reply-to-Contribution-ID indication allow associating the CPM session messages and/or the standalone CPM messages belonging to the same CPM conversation (i.e. having the same Conversation ID) into a tree view representing the CPM Conversation. The media and/or CPM Messages within a CPM session may be implicitly linked to the CPM session invitation and further organized based on the time; the CPM message thread of the media and/or the CPM messages inside the CPM sessions may form a list.

According to an exemplary embodiment of the invention, the Conversation-ID and the Contribution-ID indication and the optional In-reply-to-Contribution-ID are contained in individual standalone CPM Messages and the CPM Session Invitation messages only. The Contribution-ID identifies the individual standalone CPM message or the CPM session Invitation. The optional In-reply-to-Contribution-ID identifies the other CPM message or the other CPM session invitation to which the current CPM message or the current CPM session invitation replies or relates. If the current CPM message or the current CPM session invitation is not a reply, the In-reply-to-Contribution-ID may not be needed. The media and the CPM messages sent within a CPM session may not contain the indications above but may be implicitly associated to the indications contained in the CPM session invitation or the CPM session invitation response.

According to another exemplary embodiment of the invention, only the Conversation-ID indication may be used (i.e. there are no Contribution-ID or In-reply-to-Contribution-ID). In such embodiment, The Conversation-ID indication again allows assigning the CPM messages and media to the CPM conversations. However, the individual CPM messages and CPM sessions are not explicitly linked to each other and may not form a tree. Instead, they may just form a list of messages associated to the same conversation (having the same Conversation-ID), for example based on the sending or receiving time of the messages.

According to still another exemplary embodiment of the invention, only the Contribution-ID indication and the In-reply-to-Contribution-ID indication may be used (i.e. there is no Conversation-ID). In such embodiment, the Contribution-ID indication and the In-reply-to-Contribution-ID indication again allow associating the CPM session messages and/or the stand-alone CPM messages into a tree representing the CPM Conversation. However, the tree of CPM messages and CPM sessions may be split to parts, if a CPM message/CPM session being an inner node of the tree is removed.

Figure 3:
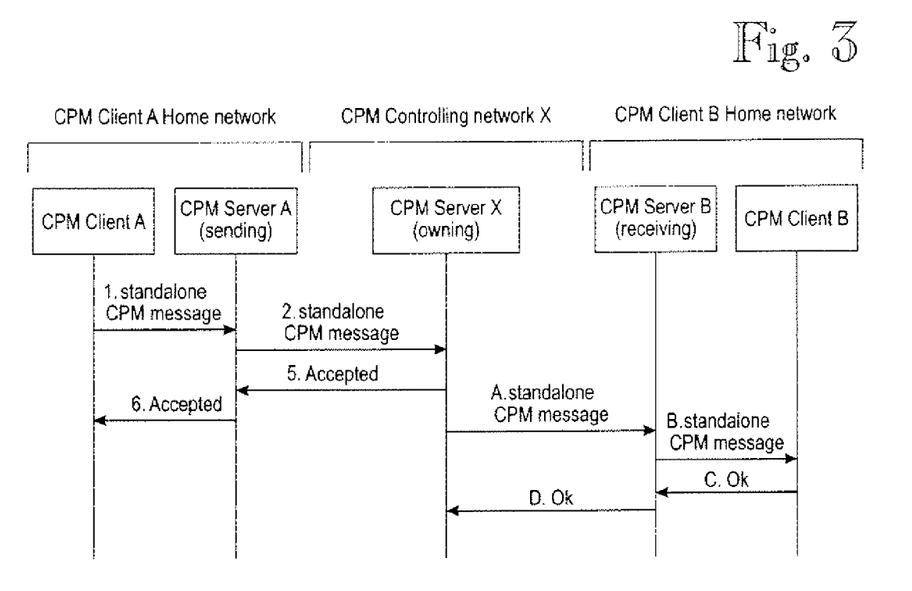
FIGS. 3 and 4 are exemplary signalling diagrams illustrating operation of exchange of message according to embodiments of the invention.
Figure 4:
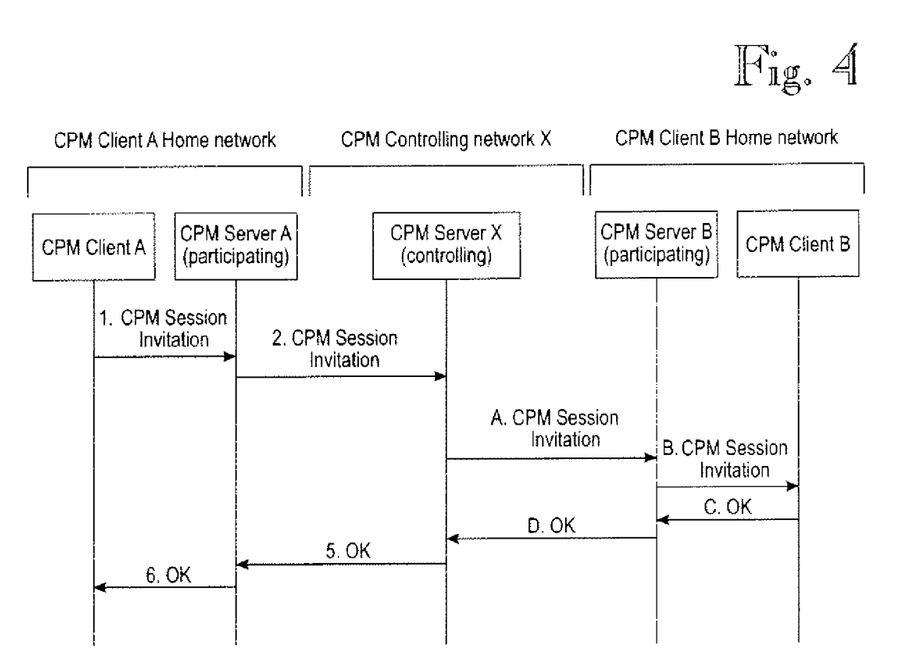
Figure 5:
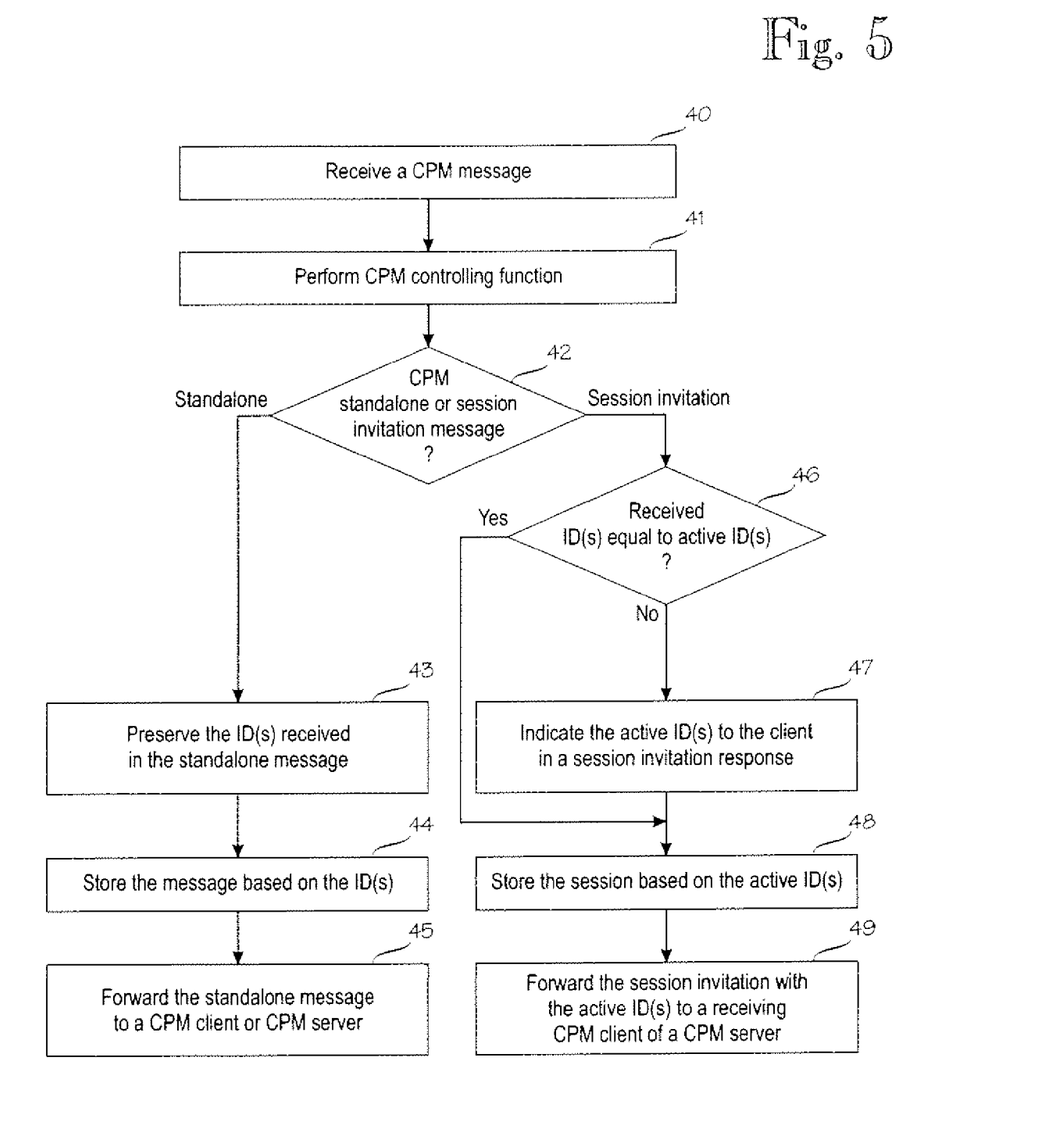
FIG. 5 is a flow diagram illustrating exemplary operation of a controlling conversation server in accordance with an embodiment of the invention.

The CPM conversation concept according to exemplary embodiments of the invention is illustrated by means examples shown in FIGS. 3, 4 and 5. In the examples, it is assumed that the CPM client and the CPM conversation servers support the CPM conversation signalling.

Referring to FIG. 3, a CPM client A may indicate the CPM Conversation-ID in the standalone CPM Message 1 sent to a conversation server A in the home network of the CPM client A. If indicated, the CPM Client A may indicate a newly generated CPM Conversation-ID, if the standalone CPM Message 1 does not relate to any other standalone CPM Message or a CPM Session, or the CPM Client A may indicate a CPM Conversation-ID of the replied stand-alone CPM Message or the replied CPM Session. If the CPM Client indicates the CPM Conversation Identity, the CPM client A additionally generates and indicates the CPM Contribution Identity in the CPM standalone message. The CPM Client A may also indicate the In-reply-to-Contribution-ID containing the CPM Contribution-ID of the replied standalone CPM message or of the replied CPM session.

In the example shown in FIG. 3, the conversation server A performs a participating function, may store the standalone message in the conversation thread based on the received Ids, and forwards the standalone CPM Message 2 to a CPM conversation server X in a controlling CPM network. Upon receiving the CPM message (step 40 in FIG. 4), the CPM conversation server X performs the controlling function (step 41), recognizes that the received message is a CPM standalone message (step 43), preserves the CPM Conversation-ID, the CPM Contribution-ID and the CPM In-reply-to-Contribution-ID, if indicated (step 43), (possibly stores the standalone message in the conversation thread based on the received IDs (step 44)), and forwards the standalone CPM message (step 45) to a CPM conversation server B in the home network of the receiving CPM client. The conversation server B performs the participating function, may store the standalone message in the conversation thread based on the received Ids, and forwards the B standalone CPM message to the receiving CPM client B. Each of the CPM conversation server A and B preserves the CPM Conversation-ID, the CPM Contribution-ID and the CPM In-reply-to-Contribution-ID, if indicated, when forwarding the standalone CPM message. Messages C, D, 5 and 6 are acknowledgement/response messages.

Referring to FIG. 4, the CPM client A may indicate the CPM Conversation-ID in the CPM session invitation message 1 sent to a conversation server A in the home network of the CPM client A. The CPM session invitation is a request sent by one participant (the inviter) to one or more other participants (the invitee(s)). This request can be sent either to establish a new CPM session between the inviter and the invitee(s) (as in the example of FIG. 4) or to solicit the invitee(s) to join an existing CPM session. If the CPM Conversation-ID is indicated in the CPM session invitation, the CPM Client A may indicate a newly generated CPM Conversation-ID, if the CPM session invitation message 1 does not relate to any other standalone CPM message or a CPM Session, or the CPM Client A may indicate a CPM Conversation-ID of the replied standalone CPM Message or the replied CPM Session. If the CPM Client indicates the CPM Conversation Identity, the CPM client A additionally generates and indicates the CPM Contribution-ID in the CPM Session Invitation. The CPM client A may also indicate the CPM In-reply-to-Contribution-ID containing the CPM Contribution-ID of the replied standalone CPM message or of the replied CPM session. The CPM conversation server A performs a participating function, preserves the CPM Conversation-ID, the CPM Contribution-ID and the CPM In-reply-to-Contribution-ID, if indicated, and forwards the CPM session invitation message 2 to a CPM conversation server X performing the controlling function in a controlling CPM network.

Upon receiving the CPM message (step 40 in FIG. 5), the CPM conversation server X performs the controlling function (step 41), recognizes that the received message is a CPM session invitation (step 43), the CPM conversation server X may determine an active CPM Conversation-ID as follows. The active CPM Conversation-ID may be determined to be a CPM Conversation-ID indicated in the CPM Pre-defined Group, if the CPM session invitation 2 is targeted to a CPM Pre-defined Group with a predefined CPM Conversation-ID. The active CPM Conversation-ID may be determined to be a CPM Conversation-ID of an initial CPM session invitation message which initiated the targeted CPM session, if the targeted CPM session already exists. The active CPM Conversation-ID may be determined to be the CPM Conversation-ID indicated in the received CPM session invitation 2.

The CPM conversation server X performing the controlling function may also determine the active CPM Contribution-ID as follows. The active CPM Contribution-ID may be determined to be a CPM Contribution-ID of of an initial CPM session invitation message which initiated the targeted CPM session, if the targeted CPM session already exists. Otherwise, the active CPM Contribution-ID may be determined to be the Contribution-ID indicated in the received CPM session invitation 2.

The CPM conversation server X performing the controlling function may further determine the active CPM In-reply-to-Contribution-ID as follows. The active CPM In-reply-to-Contribution-ID may be determined to be a CPM In-reply-to-Contribution-ID of an initial CPM session invitation message which initiated the targeted CPM session, if the targeted CPM session already exists. Otherwise, the active CPM In-reply-to-Contribution-ID may be determined to be the CPM In-reply-to-Contribution-ID indicated in the received CPM session invitation 2.

Then the CPM conversation server X performing the controlling function may check whether the CPM Conversation-ID indicated in the received CPM session invitation 2 is equal to the active CPM Conversation-ID (step 46). If the CPM Conversation-ID indicated in the received CPM session invitation 2 is different than the active CPM Conversation Identity, the CPM conversation server X may indicate the active CPM Conversation-ID, the active CPM Contribution Identity and the active CPM In-reply-to-Contribution-ID in the CPM Session Invitation response (step 47) that is illustrated by messages 5 and 6 in FIG. 4. The active CPM Conversation-ID, the active CPM Contribution Identity and the active CPM In-reply-to-Contribution-ID contained in the CPM Session Invitation response 6 override the ones contained in the CPM session Invitation 1. Thus, in response to receiving the CPM session invitation response 6 indicating the active conversation identity, the active contribution identity and the active replied contribution identity, the CPM client is configure to use these IDs.

If the CPM Conversation-ID indicated in the received CPM session invitation 2 is equal to the active CPM Conversation Identity, the CPM conversation server X may preserve the received CPM Conversation-ID, the received CPM Contribution-ID and the active CPM In-reply-to-Contribution-ID in the CPM Session Invitation response that is illustrated by messages 5 and 6 in FIG. 4.

The CPM conversation server X performing the controlling function may store the appropriate session information based on the active IDs (step 48). Then the CPM conversation server X performing the controlling function may forward the CPM session invitation message A further to the CPM conversation server B in the home network of the receiving CPM client (step 49). The CPM Conversation server X indicates the active CPM Conversation-ID, the active CPM Contribution-ID and the active CPM In-reply-to-Contribution-ID, if any, in the forwarded (terminating) CPM session invitation A. The conversation server B performs the participating function and forwards the CPM session invitation message B to the receiving CPM client B. The CPM conversation server B preserves the CPM Conversation-ID, the CPM Contribution-ID and the CPM In-reply-to-Contribution-ID, if indicated, in the forwarded (terminating) CPM session invitation B. Messages C and D are acknowledgement messages.

Any of the participants, such as clients A and B or the participating servers, may be enabled to store the CPM session history for his participation in a given CPM session, and on request, subsequently provide this CPM session history to another party (e.g. a participants who joins the CPM session halfway through).

As illustrated in steps 44 and 48 in FIG. 5, the controlling server X, or another server or network entity in the CPM system, may store the network-based storage of the CPM messages and CPM sessions belonging to the same CPM conversation into a CPM thread on behalf of a participant, such as CPM clients A and B, possibly limited to those elements associated with the CPM conversation sent or received by that participant, according to the user's preferences and/or service provider's policy. The storage presentation may be as shown in FIG. 1. The controlling server X, or another server or network entity in the CPM system, may store CPM messages, CPM sessions as CPM session histories, CPM conversations as CPM threads, and/or media. The storage uses the CPM Conversation-ID to recognize CPM messages and CPM sessions as part of a CPM conversation. The controlling server X, or another server or network entity in the CPM system, may also provide the presentation of CPM messages and CPM sessions belonging to the same CPM conversation in a conversational view in the CPM-enabled device, such as CPM clients A and B, according to the user's preferences. The controlling server X, or another server or network entity in the CPM system may be able to present the stored CPM messages and CPM session histories belonging to a CPM thread in a threaded view according to the user's preferences.

In the examples shown in FIGS. 3 and 4, there are several CPM servers and several CPM networks. However, there may be only one CPM server or any other number of CPM servers involved in the conversation. Similarly, there may be only one CPM network or any other number of CPM networks involved in the conversation. In the examples shown in FIGS. 3 and 4, an 1-1 CPM conversation is communicated between the CPM clients A and B. However, the conversation may also be a 1-N CPM conversation with many participants (N>2) and in which all participants communicate with one another. Each participant may communicate via a different CPM in a different CPM network.

In the CPM the communications are based on session initiation protocol (SIP) based technologies. SIP is an IETF (Internet Engineering Task Force) application-layer control (signaling) protocol for creating, modifying, and terminating sessions with one or more participants. With SIP it is possible to invite new participants to the existing sessions and modify the media of the existing session. There are two types of SIP messages: Requests and Responses. They share a common format. Basically SIP message may contain three parts: a start-line, message headers and an optional message-body. The start-line and each message-header line are terminated by a carriage-return line-feed sequence (CRLF). There are requests for different types of methods. INVITE method is one of the methods defined in the SIP protocol specification and its extensions. Typically, the INVITE method together with ACK and CANCEL methods are used to set up sessions, while BYE is used for terminating session, REGISTER for registering contact information and OPTIONS for querying servers about their capabilities. INFO and MESSAGE are examples of the methods defined in the extensions of SIP. Request-URI is a SIP or a SIPS URI that identifies the final destination of the request, i.e. the recipient. Protocol version is typically "SIP/2.0".

According to exemplary embodiments of the invention, a standalone CPM message may be mapped to a SIP MESSAGE request (e.g. in case of a page mode message) or a SIP INVITE request (e.g. in case of a large mode message), and a CPM session invitation may be mapped to a SIP INVITE request.

In the following, various exemplary ways for mapping the indications according to invention to SIP protocol headers and/or parameters are described.

EXAMPLE 1

According to an embodiment of the invention, when SIP INVITE request is sent from a CPM client to a CPM conversation server performing the controlling Function, the SIP From header parameters may contain one or more of the CPM Conversation-ID, the CPM Contribution-ID and the CPM In-reply-to-Contribution-ID. When the SIP 200 "OK" INVITE response is sent from CPM conversation server performing the controlling function to CPM Client, the SIP To header parameters may contain one or more of the CPM Conversation-ID, the CPM Contribution-ID and the CPM In-reply-to-Contribution-ID. When SIP INVITE request is sent from CPM conversation server performing the controlling function to a CPM client, the SIP From header parameters may contain one or more of the CPM Conversation-ID, the CPM Contribution-ID and the CPM In-reply-to-Contribution-ID. When SIP MESSAGE request is sent, the SIP From header parameters may contain one or more of the CPM Conversation-ID, the CPM Contribution-ID and the CPM In-reply-to-Contribution-ID.

EXAMPLE 2

According to an embodiment of the invention, when SIP INVITE request is sent from a CPM client to a CPM conversation server performing the controlling function, the SIP Contact header parameters or the SIP Request-URI parameters may contain one or more of the CPM Conversation-ID, the CPM Contribution-ID and the CPM In-reply-to-Contribution-ID. When SIP INVITE request or the SIP 200 "OK" INVITE response is sent from a CPM conversation server performing the controlling function to a CPM client, the SIP Contact header parameters may contain one or more of the CPM Conversation-ID, the CPM Contribution-ID and the CPM In-reply-to-Contribution-ID. When SIP MESSAGE request is sent, the "message/CPIM" body of the SIP MESSAGE request maybe extended with headers containing one or more of the CPM Conversation-ID, the CPM Contribution-ID and the CPM In-reply-to-Contribution-ID.

EXAMPLE 3

According to an embodiment of the invention, the SIP INVITE request and SIP 200 "OK" INVITE response may be extended with a new message or cpim body which only contains headers containing one or more of the CPM Conversation-ID, the CPM Contribution-ID and the CPM In-reply-to-Contribution-ID. When SIP INVITE request is sent from a CPM client to a CPM conversation server performing the controlling function, the new message or cpim body may be added with headers containing one or more of the CPM Conversation-ID, the CPM Contribution-ID and the CPM In-reply-to-Contribution-ID. When SIP INVITE request or the SIP 200 "OK" INVITE response is sent from a CPM conversation server performing the controlling function to a CPM client, the new message/cpim body may be added with headers containing one or more of the CPM Conversation-ID, the CPM Contribution-ID and the CPM In-reply-to-Contribution-ID. When SIP MESSAGE request is sent, the "message/cpim body of the SIP MESSAGE request may be extended with headers containing one or more of the CPM Conversation-ID, the CPM Contribution-ID and the CPM In-reply-to-Contribution-ID.

EXAMPLE 4

According to an embodiment of the invention, when SIP INVITE request is sent from a CPM client to a CPM conversation server performing the controlling function, the SIP header "In-reply-to" may contain In-reply-to-Contribution-ID, the SIP header "Call-Info" may contain Conversation-ID, and the SIP Contact header parameter or the message/cpim header may contain Contribution-ID. When SIP INVITE request or the SIP 200 "OK" INVITE response is sent from a CPM conversation server performing the controlling function to a CPM client, the SIP header "In-reply-to" may contain In-reply-to-Contribution-ID, the SIP header "Call-Info" may contain Conversation-ID, and the SIP Contact header parameter or the message/cpim header may contain Contribution-ID. When SIP MESSAGE request is sent, the SIP header "In-reply-to" may contain In-reply-to-Contribution-ID, the SIP header "Call-Info" may contain Conversation-ID, and the message/cpim header may contains Contribution-ID.

EXAMPLE 5

Other SIP headers or message/cpim headers may be used to carry the needed pieces of information.

EXAMPLE 6

Other feature-parameters, such as the feature tag-value, may be used as a source of information for identification. For example: +oma.cpm-Conv-ID="Conversation-ID", where Conversation-ID may be a string, integer or both

EXAMPLE 7

The combination of "Conversation-Identity", "Contribution-Identity" and "In-reply-to-Contribution-ID" indications may be indicated in the In-Reply-to header field.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art. A communication terminal may refer to any user communication device. A term "communication device" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal having S60 operating system from Nokia Corporation. Thus, the application capabilities of the device according to various embodiments of the invention may include native S60 applications available in the terminal, or subsequently installed applications. The interworking function IWF may be implemented in any network element, such as a server.

It will be obvious to a person skilled in the art that, as the technology advances, the inventive concept can be implemented in various ways. The invention and its embodiments are not limited to the examples described above but may vary within the scope of the claims.

What is claimed is:

1. A method, comprising facilitating a processing of or processing data or information or at least one signal, the data or information or at least one signal based, at least in part, on the following:
   at least one exchange of at least one of a standalone message and a session invitation message in a conversation between two or more participants via a network apparatus within a converged messaging framework,
   at least one determination to provide at least one of the standalone message and the session invitation message with at least one of: a conversation identity linking the at least one of the standalone message and the session invitation message to the conversation; a contribution identity to denote the standalone message or the session invitation message; and a replied contribution identity which equals to a contribution identity of a replied standalone message or a replied session invitation message,
   wherein the at least one standalone message or the session invitation message is a reply to one or more preceding standalone messages or session invitation messages within the conversation; and
   at least one storage of the at least one of the standalone message and the sessions invitation message belonging to the conversation, based at least in part, on at least one of the conversation identity, the contribution identities and the replied contribution identities.

2. A method according to claim 1, wherein the data or information or at least one signal are further based, at least in part, on the following:
   at least one indication of an active conversation identity, an active contribution identity and an active replied contribution identity, if any, in a termination session invitation message sent from the network apparatus.

3. A method according to claim 1, wherein the data or information or at least one signal are further based, at least in part, on the following:
   receipt of at least one standalone message or a session invitation message, the message indicating at least one of a conversation identity, a contribution identity and a replied contribution identity,
   at least one determination to preserve the received conversation identity, contribution identity and replied contribution identity indicated in said received standalone message, when forwarding said received standalone message.

4. A method according to claim 1, wherein the data or information or at least one signal are further based, at least in part, on the following:
   at least one determination to set an active conversation identity according to:
   a pre-defined conversation identity of a pre-defined communication group, if a received session invitation message is for a pre-defined group with a pre-defined conversation identity; or a conversation identity of the session invitation which initiated a targeted session, if a received message is targeted to a session that already exists and is to be joined; or a conversation identity indicated in a presently received session invitation.

5. A method according to claim 1, wherein the data or information or at least one signal are further based, at least in part, on the following:
   at least one determination to set an active contribution identity according to:
   a contribution identity of the session invitation which initiated a session, if the targeted session already exists and is to be joined; or
   a contribution identity indicated in a presently received session invitation.

6. A method according to claim 1, wherein the data or information or at least one signal are further based, at least in part, on the following:
   at least one determination to set an active in-reply-to-contribution identity according to:
   a replied contribution identity of the session invitation which initiated a targeted session, if the targeted session already exists and is to be joined; or
   a replied contribution identity indicated in a presently received session invitation message.

7. A method according to claim 1, wherein the data or information or at least one signal are further based, at least in part, on the following:
   in response to receiving, for an already existing session, a session invitation message indicating a conversation identity that is different from an active conversation identity, at least one determination to indicate in a session invitation response the active conversation identity, the active contribution identity and the active replied contribution identity to a sender of the session invitation message,
   in response to receiving, the session invitation response indicating the active conversation identity, the active contribution identity and the active replied contribution identity, at least one configuration to use the active conversation identity, the active contribution identity and the active replied contribution identity.

8. A method according to claim 1, wherein the data or information or at least one signal are further based, at least in part, on the following:
   at least one determination to map a standalone message or a session invitation message to a session initiation protocol message, and
   at least one determination to map at least one of a conversation identity, a contribution identity and a replied contribution identity to at least one of parameters and headers of the session initiation message.

9. A network element comprising means for performing any of the method steps of claim 1.

10. A non-transitory computer-readable storage medium carrying one or more sequences of one or more instructions which, when executed by one or more processors, cause an apparatus to at least perform any of the method steps of claim 1.

11. An apparatus, comprising: at least one processor; and at least one memory including computer program code for one or more programs, the at least one memory and the computer program code configured to, with the at least one processor, cause the apparatus to at least process or facilitate a processing of a result of:
at least one determination to transmit at least one of a standalone message and a session invitation message in a conversation within a converged messaging framework,
at least one determination to provide at least one of the standalone message and the session invitation message with at least one of: a conversation identity linking the at least one of standalone message and the session invitation message to the conversation; a contribution identity to denote the standalone message or the session invitation message; and a replied contribution identity which equals to a contribution identity of a replied standalone message or session invitation message,
wherein, the at least one standalone message or the session invitation message is a reply to one or more preceding standalone messages or session invitation messages within the conversation; and
at least one determination to enable storage of the at least one of the standalone message and the session invitation message belonging to the conversation, based, at least in part, on at least one of the conversation identity, the contribution identities and the replied contribution identities.

12. An apparatus according to claim 11, wherein the result is further based, at least in part, on:
at least one storage of the at least one of a standalone message and a session invitation message belonging to the conversation, based, at least in part, on at least one of the conversation identity, the contribution identities and the replied contribution identities.

13. An apparatus, comprising: at least one processor; and at least one memory including computer program code for one or more programs, the at least one memory and the computer program code configured to, with the at least one processor, cause the apparatus to at least process or facilitate a processing of a result of:
at least one exchange of at least one of a standalone message and a session invitation message relating to a conversation between two or more participants within a converged messaging framework,
at least one determination to provide at least one of the standalone message and the session invitation message with at least one of: a conversation identity linking the at least one of the standalone message and the session invitation message to the conversation; providing at least one of the standalone message and the session invitation message with a conversation identity linking the at least one of the standalone message and the session invitation message to the conversation;
and a replied contribution identity which equals to a contribution identity of a replied stand alone message or session invitation message,
wherein the at least one standalone message or the session invitation message is a reply to one or more preceding standalone messages or session invitation messages within the conversation;
at least one storage of the standalone message and the session invitation message belonging to the conversation, based, at least in part, on at least one of the conversation identity, the contribution identities and the replied contribution identities.

14. A computer program product, embodied on a non-transitory computer-readable storage medium, including one or more sequences of one or more instructions which, when executed by one or more processors, cause an apparatus to at least perform any of the method steps of claim 1.

* * * * *